United States Patent Office 2,994,689
Patented Aug. 1, 1961

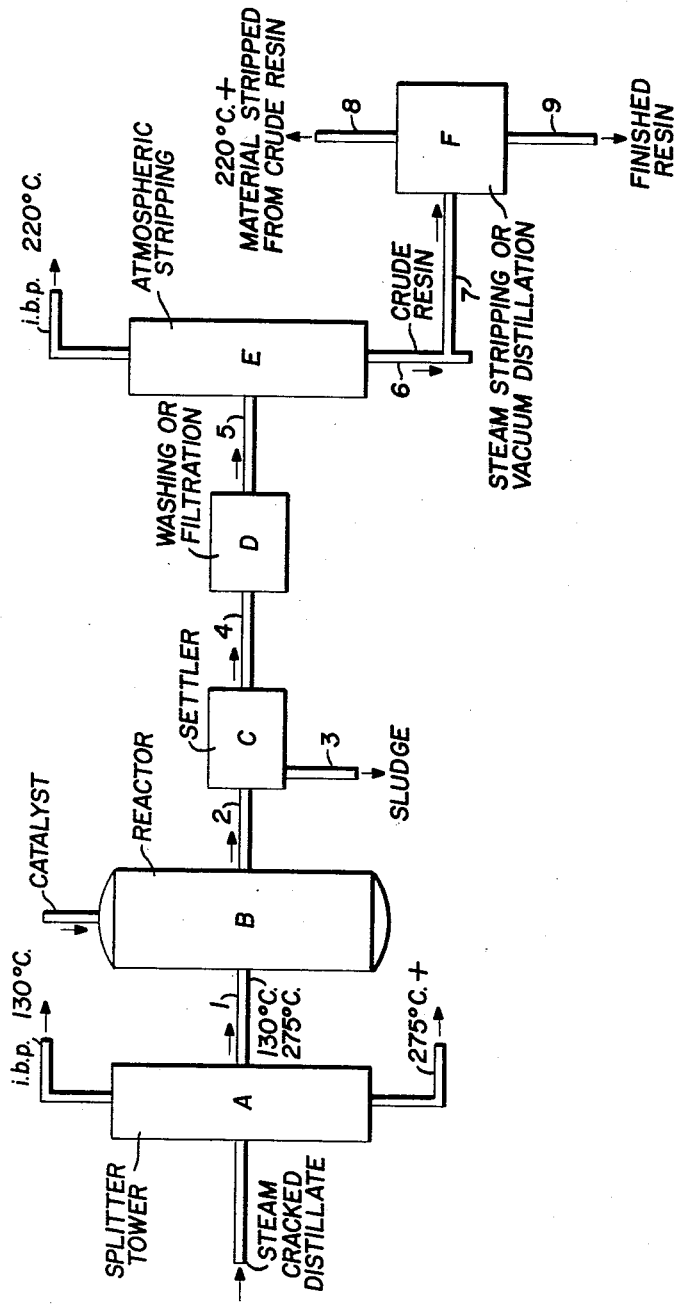

2,994,689
UTILIZATION OF HIGH BOILING FRACTIONS IN PREPARING PETROLEUM RESINS
Fred W. Banes, Westfield, Stanley B. Mirviss, Roselle, and Joseph F. Nelson, Westfield, N.J., assignors to Esso Research and Engineering Company, a corporation of Delaware
Filed Apr. 30, 1956, Ser. No. 581,667
4 Claims. (Cl. 260—82)

This invention broadly pertains to the production of improved resins having high softening points and low unsaturation from selected steam cracked petroleum fractions by polymerization and, more particularly, it pertains to the utilization of steam cracked fractions boiling from 85° up to 275° C. for making such resins using a Friedel-Crafts polymerization catalyst such as an aluminum halide. This application is a continuation-in-part of application Serial No. 318,002, filed October 31, 1952, in the names of Fred W. Banes, Stanley B. Mirviss and Joseph F. Nelson, and now abandoned.

It is possible to treat steam cracked distillate fractions with catalysts and produce resins of varying quality and utility. However, these resins have generally been subject to certain seemingly inherent difficulties, including such disadvantages as low softening point and high unsaturation. For some important uses, it is essential that the resins have relatively low unsaturation values such as are, for example, measured by the conventional iodine number values. These resins also should necessarily have softening points of 90° C. or higher. The uses for which these special high softening point, low unsaturation resins are especially adapted include floor tile and rubber and plastic formulations.

The improved process of this invention relates to the preparation of such petroleum resins of high softening and low unsaturation from steam cracked distillate fractions boiling in the range of about 85° up to 275° C. and preferably fractions boiling predominantly in the range of about 130° to 275° C. By polymerizing these fractions under critical conditions, it is possible to obtain thereby petroleum resins having softening points in the range of 90° up to 120° C. and iodine number values in the range of 60 and 100, and which are soluble in hydrocarbon solvents.

Petroleum fractions such as kerosene, gas oil, naphtha, etc. are cracked in the presence of steam at temperatures of 1000° F. up to 1500° F., i.e. about 540° C. up to about 815° C., to give highly unsaturated products. The olefinic fractions obtained are distilled in order to obtain a cut of the boiling range of about 85° up to 275° C. For the best quality resins, a more narrow cut of boiling range of about 130° to 275° C. is best used although as much as 20% of the cut may boil below 130° C.

Such a petroleum fraction which may be steam cracked and polymerized in accordance with the present invention comprises a light gas oil or other hydrocarbon fraction having a boiling range of about 185° to 1000° F. (i.e. about 85° to 550° C.), advantageously about 250° to 850° F. (i.e. about 120° to 450° C.), preferably between about 300° to 750° F. (i.e. about 150° to 400° C.). The API° gravity of the petroleum hydrocarbon fraction to be steam cracked is preferably between about 30 and 45. This hydrocarbon fraction advantageously contains about 5 to 40 weight percent aromatics (by silica gel analysis), the remainder of the fraction being about 60 to 95 weight percent of an admixture predominantly of naphthenes and paraffins. Other desirable characteristics of the petroleum hydrocarbon fraction to be steam cracked are as follows:

| Characteristic: | Preferred range |
|---|---|
| Refractive index | 1.40–1.60 |
| Aniline point (° F.) | 70–220 |
| Average molecular weight | 150–400 |

The percent heterocyclics in the foregoing fraction is preferably between about 0–4.0%, the percent sulfur being generally within the range of about 0–2%.

Such fractions as the foregoing, which as beforementioned may be kerosenes, gas oils, naphthas, or equivalent fractions are preferably cracked in the presence of about 65–90%, preferably between about 70–85 mole percent steam at temperatures between about 1100° and 1450° F. (about 600° to 800° C.), preferably between about 1200° and 1450° F., i.e. about 650° to 750° C. The time for completing the steam cracking operation is generally between about 0.05 and 30, advantageously between about 0.1 and 15.0, preferably between about 0.1 and 5.0 seconds.

The resulting steam cracked hydrocarbon fraction is then distilled in order to obtain a cut boiling between about 85° and 275° C. This cut is utilized as the feed stream in the polymerization step of the process of the present invention.

Typical analyses of feed streams which are particularly useful in this invention indicate the following composition ranges:

| Component: | Wt. percent |
|---|---|
| Diolefins (chloromaleic anhydride reactive)[1] | 20–10 |
| Olefins | 60–20 |
| Aromatics | 18–40 |
| Paraffins and naphthenes | 2–30 |
| Boiling range: | |
| 85–130° C. | 0–20 |
| 130–275° C. | 100–70 |
| 275° C. + | 0–10 |

[1] Obtained by adding 1.5 to 3.0 ml. of distillate to a solution of 2.5 ml. of chloromaleic anhydride in 2 ml. of benzene (containing 0.17 g. t-butyl catechol), reacting for 3 hours at 100° C. and steam stripping for 2 hours to recover HCl (1 mole HCl/mole of diolefin).

In some instances the aromatic content of the feed streams may be somewhat higher, up for example 60%, with a corresponding reduction in the other components of the streams, particularly the paraffins and naphthenes which may then amount to only 1% or less or may even be completely absent.

The preferred feed stocks are further characterized by their high concentration of hydrocarbons which react with maleic anhydride at 100° C. in the absence of an inhibitor. For example, ordinary determination of diolefins by reaction with chloromaleic anhydride at 100° C. (an inhibitor such as t-butyl catechol being present) indicates the presence of 10 to 20% of acyclic diolefins; however, by reacting the cuts with an excess of maleic anhydride at 100° C. for 3 to 4 hours and in the absence of an inhibitor, 15 to 40% of the constituents are reacted. This difference may be attributed to the lack of the inhibitor. The additional reaction materials in the feed stock, i.e., about 5 to 20 weight percent, are largely reactive aromatics which if seperated as a concentrate and analyzed as a whole would have a refractive index in the range of between about 1.49 to 1.54. For example, a 130° to 230° C. distillate fraction contained 16% of material which was reactive with chloromaleic anhydride in the presence of an inhibitor, but 29% reactive with maleic anhydride in the absence of an inhibitor. The additional 13% which reacted had a calculated refractive index of 1.53. On the other hand, a distillate boiling in the range of 50° to 130° C. contained 12% chloromaleic anhydride reactive materials in the presence of an inhibitor and 17% maleic anhydride reactive components without an inhibitor. The refractive index of the incremental reactive material was 1.45, i.e. aliphatic diolefins.

More specifically, the preferred polymerization feed stock to be processed in accordance with the present invention comprises about 10 to 20 weight percent diolefins, about 20 to 60 weight percent monoolefins, about 18 to 60 weight percent aromatics and about 0 to 30 weight percent of an admixture of paraffins and naphthenes wherein a typical distribution of compounds within the foregoing classes is as follows:

| Diolefins | Wt. Percent (Typical Range) | Wt. Percent (Preferred Range) |
|---|---|---|
| Isoprene | 0-2.0 | 0.1-0.6 |
| Piperylene | 0-2.0 | 0.1-0.6 |
| $C_6$ Cis- and Trans-Diolefins | 0-2.0 | 0.1-0.7 |
| $C_7$ Cis- and Trans-Diolefins | 0.3-5.0 | 0.5-3.0 |
| $C_8$ Cis- and Trans-Diolefins | 0.5-8 | 1.0-4.3 |
| $C_9$ Cis- and Trans-Diolefins | 0.2-5.0 | 0.6-2.0 |
| $C_{10}$ Cis- and Trans-Diolefins | 0-2 | 0.2-0.8 |
| $C_{11}$ Cis- and Trans-Diolefins | 0.3-5.0 | 1-2 |
| $C_{12}$ Cis- and Trans-Diolefins | 0.3-5.0 | 1-2 |
| $C_{13}$ Cis- and Trans-Diolefins | 0.2-5.0 | 1-2 |
| $C_{14}$ Cis- and Trans-Diolefins | 0.2-5.0 | 1-2 |
| Other Diolefins | Balance | 0-2.8 |

| Monoolefins | Wt. Percent (Typical Range) | Wt. Percent (Preferred Range) |
|---|---|---|
| $C_6$ Monoolefins | 0-10 | 1-5 |
| $C_7$ Monoolefins | 0-15 | 2-6 |
| $C_8$ Monoolefins | 0.5-16.0 | 2-7 |
| $C_9$ Monoolefins | 0.5-10.0 | 1-5 |
| $C_{10}$ Monoolefins | 1.5-15.0 | 2-8 |
| $C_{11}$ Monoolefins | 2.0-12.0 | 2-6 |
| $C_{12}$ Monoolefins | 1.5-15.0 | 2-8 |
| $C_{13}$ Monoolefins | 0.5-13.0 | 2-6 |
| $C_{14}$ Monoolefins | 0.5-18.0 | 1-10 |
| Other Monoolefins | Balance | 0-6 |

AROMATIC HYDROCARBONS

| Component | Typical Range, Wt. Percent | Preferred Range, Wt. Percent | Refractive Index | Boiling Point (° C.) |
|---|---|---|---|---|
| A. Substantially inactive aromatics: | | | | |
| Benzene | 0-10 | 3-6 | 1.50 | 81 |
| Toluene | 5-20 | 8-12 | 1.50 | 111 |
| B. Moderately active aromatics: | | | | |
| Xylenes | 2-15 | 4-10 | 1.50 | 138-144 |
| Ethyl Benzene | 0.5-6.0 | 1-3 | 1.50 | 136 |
| Naphthalenes | 0-15 | 4-10 | | 218-264 |
| Durene | 0-3 | 1-2 | | 193 |
| C. Reactive aromatics: | | | | |
| Styrene | 0.5-5.0 | 0.9-4.5 | 1.54 | 145 |
| Vinyl Toluenes | 0.3-4.0 | 0.5-1.5 | 1.54 | |
| Vinyl Xylenes | 0.2-3.0 | 0.3-2.0 | 1.54 | |
| Alpha-methylstyrene | 0.5-4.0 | 0.7-3.0 | 1.54 | |
| Beta-methylstyrene | 0.5-3.0 | 0.6-2.0 | 1.53 | |
| Indenes | 0-15 | 1.0-7.0 | | 181-225 |
| $C_9$ to $C_{14}$ Vinyl Aromatic Hydrocarbons | (¹) | 0-1.6 | | 150-250 |
| Paraffins and Naphthenes | 0-30 | 1-10 | | 85-275 |

¹ Balance of the reactive aromatics.

These preferred feed streams are treated with a polymerization catalyst such as aluminum chloride or aluminum bromide. Boron fluoride is also operative although poorer results are obtained. From 0.25 up to 3.0% of the polymerization catalyst is the preferred amount of catalyst employed in the preparation of the resins. The polymerization reaction is carried out at temperatures in the range of −10° to 70° C. and preferably 0° to 60° C.

High quality and yields of resins can be obtained with aluminum halide catalysts in various forms. These include solid granular $AlCl_3$, powdered $AlCl_3$, solutions of $AlCl_3$ using solvents such as methyl and ethyl chlorides, slurries of $AlCl_3$ using, for example, liquid hydrocarbons such as hexane, and solutions of $AlBr_3$ in hydrocarbons and the like.

The greater portion of the catalyst is separated from the polymerization reaction mixture by allowing the insoluble sludge to settle out. The supernatant solution remaining is freed of residual catalyst by water and/or caustic washings or by the addition of some precipitating agent such as methyl alcohol, followed by subsequent filtration. The final, washed resin solution is then stripped of unreacted hydrocarbons and low molecular weight oily polymers.

It is desirable to subject the product to a further vacuum stripping operation in which the final bottoms temperature of 200 to 300° C. at 2 to 10 mm. Hg is attained. The exact stripping and finishing operations will depend on the desired consistency and desired softening point of the resin product which is preferably maintained over 90° C. As an alternative method, the crude resin can be stripped with steam to any desired softening point of the finished resin.

The invention rescribed in more complete detail by the following examples and the accompanying figure, although it is not intended to limit the scope of the invention thereto.

*Example 1*

Resin products were prepared by the polymerization of distillate streams with aluminum chloride and boron fluoride. In general, the analysis of the data obtained from these products shows that the resins produced by $AlCl_3$ are much superior to those produced with $BF_3$. These products were prepared from a steam cracked distillate boiling in the range of about 90° to about 275° C., with 89% of the feed boiling in the range of 113° to 226° C., and 83% boiling above 130° C. The steam cracked distillate stream to be polymerized was derived from a light gas oil having the following ASTM distillation analysis:

| | Temperature, ° F. |
|---|---|
| Initial boiling point | 438 |
| 10% (distilled over) | 546 |
| 20% (distilled over) | 576 |
| 50% (distilled over) | 606 |
| 70% (distilled over) | 622 |
| 90% (distilled over) | 642 |
| Final boiling point | 662 |

The gas oil had the following inspections:

| Property: | Value |
|---|---|
| API° gravity | 36.5 |
| Refractive index | 1.47 |
| Percent aromatics (by silica gel analysis) | 16.5 |
| Percent naphthenes+paraffins | 79.5 |
| Aniline point, ° F | 181 |
| Average molecular weight | 260 |
| Percent heterocyclics | <4.0 |
| Percent sulfur | <0.082 |

The foregoing gas oil was cracked for 2.2 seconds above 900° F. and 0.9 second above 1,000° F. in the presence of 80 mole percent steam with a final temperature of 1375° F. The resulting cracked products formed were then distilled to produce a stream boiling in the range between 90° C. and 275° C. The composition of this distillate stream, which is to be employed as polymerization feed, was as follows:

DIOLEFINS

| Component: | Weight percent |
|---|---|
| Isoprene | 0.4 |
| Piperylene | 0.4 |
| $C_6$ trans-diolefins | 0.3 |
| $C_6$ cis-diolefins | 0.3 |
| $C_7$ trans-diolefins | 1.7 |
| $C_7$ cis-diolefins | 1.5 |
| $C_8$ trans-diolefins | 2.4 |
| $C_8$ cis-diolefins | 2.0 |
| $C_9$ trans-diolefins | 1.3 |
| $C_9$ cis-diolefins | 1.0 |
| $C_{10}$ trans-diolefins | 0.4 |
| $C_{10}$ cis-diolefins | 0.2 |
| $C_{11}$ trans-diolefins | 1.2 |
| $C_{11}$ cis-diolefins | 0.2 |
| $C_{12}$ diolefins | 1.5 |
| $C_{13}$ diolefins | 1.7 |
| $C_{14}$ diolefins | 1.7 |
| Total diolefins | 18.2 |

MONOOLEFINS

| Component: | Weight percent |
|---|---|
| $C_6$ monoolefins | 1.8 |
| Type I | 0.8 |
| Type II | 0.3 |
| Type III | 0.7 |
| $C_7$ monoolefins | 4.3 |
| Type I | 1.0 |
| Type II | 1.2 |
| Type III, IV, and V | 2.1 |
| $C_8$ monoolefins | 4.4 |
| Type I | 0.3 |
| Type II | 1.6 |
| Type III, IV, and V | 2.5 |
| $C_9$ monoolefins | 2.7 |
| Type I | 0.5 |
| Type II | 0.8 |
| Type III, IV, and V | 1.4 |
| $C_{10}$ monoolefins | 4.0 |
| Type I | 2.3 |
| Type II | 0.5 |
| Type III | 1.2 |
| $C_{11}$ monoolefins | 3.5 |
| Type I | 2.0 |
| Type II | 0.8 |
| Type III | 0.7 |
| $C_{12}$ monoolefins | 4.0 |
| $C_{13}$ monoolefins | 3.5 |
| $C_{14}$ monoolefins | 4.5 |
| Total monoolefins | 32.7 |

AROMATIC HYDROCARBONS

| Component | Weight Percent | Refractive Index | Boiling Point, °C. |
|---|---|---|---|
| A. Substantially inactive aromatics: | | | |
| Benzene | 4.4 | 1.50 | 81 |
| Toluene | 10.3 | 1.50 | 111 |
| B. Moderately active hydrocarbons: | | | |
| m-xylene | 2.8 | 1.50 | 139 |
| p-xylene | 0.8 | 1.49 | 138 |
| o-xylene | 1.9 | 1.51 | 144 |
| Ethyl benzene | 2.2 | 1.50 | 136 |
| Naphthalene | 1.3 | 1.58 | 218 |
| Alpha-methyl-naphthalene | 2.3 | 1.60 | 245 |
| Beta-methyl-naphthalene | 1.7 | 1.62 | 241 |
| Dimethyl naphthalenes | 2.7 | 1.61 | 264 |
| Durene | 1.0 | | 193 |
| C. Reactive aromatics: | | | |
| Styrene | 1.5 | 1.54 | 145 |
| 1-methyl-2-vinyl benzene | 0.7 | 1.54 | |
| 1-methyl-4-vinyl benzene | 1.3 | 1.54 | |
| Vinyl xylene | 0.7 | 1.54 | |
| Alpha-methyl-styrene | 1.3 | 1.55 | |
| Beta-methyl-styrene | 0.8 | 1.53 | |
| Indene | 1.3 | 1.57 | 181 |
| Methyl Indene | 1.0 | 1.56 | 197 |
| Dimethyl indene | 1.9 | 1.56 | 225 |
| Non-specific vinyl aromatic hydrocarbons | | | 130-250 |
| $C_9$ | 0.8 | | |
| $C_{10}$ | 0.1 | | |
| $C_{11}$ | 0.6 | | |
| $C_{12}$ | 0.2 | | |
| $C_{13}$ | 1.7 | | |
| $C_{14}$ | 0.9 | | |
| Total Aromatic Hydrocarbons | 47.3 | | |
| Paraffins and Naphthenes | 1.1 | | |

The above distillate was then polymerized with aluminum chloride and with $BF_3$ as catalysts, the reaction temperature ranging from about 39° up to 45° C. The $AlCl_3$ reaction product was freed of residual catalyst by the addition of 3% of methyl alcohol followed by filtration and stripping. The $BF_3$ reaction mixture was quenched with isopropyl alcohol and water washed prior to stripping.

The $AlCl_3$ polymerization offers advantages in that, for a given softening point of the product resin, the yields are considerably greater than can be realized by the $BF_3$ catalysis. Additionally, the unsaturation of the $AlCl_3$ products is lower than that of the $BF_3$ resins. On the other hand, relatively small proportions of $BF_3$ are required, and since it is normally employed as a gas, $BF_3$ may be readily separated from the resin-product. The comparative data obtained on these resins are shown in Table I below.

TABLE I

| | Catalyst | |
|---|---|---|
| | $AlCl_3$ | $BF_3$ |
| Reaction Temperature, °C. | 39–45 | 40–45 |
| Percent Catalyst on Hydrocarbon Feed | 1.5 | 0.47 |
| Product Recovered as 220° C.+Residue: | | |
| Yield, Wt. Percent on Feed | 28.5 | 20 |
| Viscosity, SSU @ 210° F | 117 | 57 |
| Color, Gardner (diluted)[1] | 7 | 6 |
| Non-Volatile @ 100° C.— | | |
| 3 Hours | 79.4 | 80.3 |
| 24 Hours | 67.9 | 66.4 |
| Ash, Wt. Percent | trace | 0.05 |
| Product from Stripping to 260° C. Bottoms Temperature @ 17 mm.: | | |
| Yield, Wt. Percent on Hydrocarbon Feed | 18.7 | 10.5 |
| Softening Point, °C.[2] | 76 | 76 |
| Product from Stripping to 260° C. Bottoms Temperature @ 1–2 mm.: | | |
| Yield, Wt. Percent on Hydrocarbon Feed | 15.8 | 8.5 |
| Softening Point, °C.[2] | 104 | 104 |
| Iodine Number[3] | 80 | 96 |
| Product from Stripping with Steam for 4 Hours @ 260° C.: | | |
| Yield, Wt. Percent on Hydrocarbon Feed | 16.4 | 8.8 |
| Softening Point, °C.[2] | 98 | 93 |

[1] Gardner standard compared to the color of a solution containing 1 g. polymer in 67 ml. xylenes.
[2] Ring and Ball (ASTM E-28-51-T).
[3] Wijs Iodine Number, 5 ml. of 0.2 N Wijs solution per 0.05 g. of resin in 100 ml. of carbon tetrachloride.

*Example 2*

A second series of resins was prepared from high boiling steam cracked distillates using $AlCl_3$ as the polymerization catalyst at 20 to 25° C. The distillate had an initial boiling point of about 90° C. but more than 80% boiled in the range of 130 to 275° C. By analysis, the distillate contained about 30% paraffins and naphthenes, 40% aromatics and 30% olefins and diolefins. The resulting data are shown in Table II. These feed streams are thus shown to produce excellent quality resins having high softening points and low unsaturation values.

TABLE II

| Boiling Range of Feed | Wt. Percent $AlCl_3$ on Feed | Wt. Percent Resin | Resin Properties | |
|---|---|---|---|---|
| | | | Soft. Pt., °C. | Wijs Iodine Number[1] |
| 90°–275° C. (84%>130° C.) | 1 | 16 | 97 | 89 |
| | 2 | 15.5 | 109 | 79 |
| 113–225° C. (90%>130° C.) | 1 | 13.8 | 99 | 88 |
| | 2 | 15.9 | 94 | 81 |

[1] 5 ml. of 0.2 N Wijs solution per 0.05 g. of resin in 100 ml. carbon tetrachloride.

*Example 3*

A sample of distillate similar in composition to that described in Example 2, except that 55% of this distillate sample boiled below 130° C., was polymerized with 1% solid $AlCl_3$ at 25° C. The resin product in this case represented a yield of only 11% on the feed. The resin had a softening point of 97° C. and an iodine number of 111. These adverse data show that distillate samples containing substantially more than 20% of material boiling below about 130° C. give resins which are not satisfactory, both because of low yield and high unsaturation.

*Example 4*

A series of resins was prepared from high boiling steam cracked distillates by treating with 1% AlCl$_3$ at a temperature of about 25° C. The distillates boiled predominantly in the range of 130° to about 275° C. and contained an average of about 16% of components which reacted with the chloromaleic anhydride (diolefins), 40% aromatics, 4% paraffins and naphthenes and 40% cyclic and acyclic olefins. The results presented below in Table III show that, with proper limitations as to boiling range of the polymerization feed streams, high softening point resins of low unsaturation are produced. It should be noted that, when the feed contains 32 weight % of material boiling below 130° C., the unsaturation properties of the resin product are undesirably high.

TABLE III

| Boiling Range of Feed | Wt. Percent Boiling below 130° C. | Wt. Percent AlCl$_3$ | Wt. Percent Resin | Resin Properties | |
|---|---|---|---|---|---|
| | | | | Soft. Pt., °C. | Iodine Number [1] |
| 65–275 | 32 | 1 | 27 | 108 | 112 |
| 90–250 | 17 | 1 | 27 | 106 | 96 |
| 130–230 | | 1 | 26.2 | 111 | 75 |
| 130–250 | | 1 | 29 | 111 | 74 |
| 140–250 | | 1 | 26 | 106 | 81 |
| 170–190 | | 1 | 35 | 107 | 69 |
| 210–230 | | 1 | 25 | 103 | 73 |

[1] 5 ml. of 0.2 N Wijs solution per 0.05 g. resin in 100 ml. carbon tetrachloride.

*Example 5*

A distillate stream boiling in the range of 30 to 130° C. (2% >130° C.) was polymerized with 1% AlCl$_3$ using the same procedures given in the preceding examples. This distillate contained 36% aromatics, 14% chloromaleic anhydride reactive materials (diolefins), 49% acyclic and cyclic olefins and approximately 1% paraffins. The resin product had a softening point of 83° C. and represented a yield of 29% on the feed. The Wijs iodine number of the product was 116. By comparison to the previous examples, it can be seen that the high boiling distillates shown in those examples show distinct advantages over the low boiling distillate of this example in producing resins of higher softening point and lower unsaturation.

*Example 6*

To illustrate the invention in a schematic manner, the accompanying figure is presented. A steam cracked distillate fraction boiling in the range of 85° to 275° C. and preferably between 130° and 275° C., as recovered in a stream from a splitter tower A, is passed by line 1 to a polymerization reactor B and is therein subjected to a polymerization reaction. The polymerization is carried out with from 0.25 to 3.0% of AlCl$_3$ at temperatures of from −10° up to +70° C., preferably 0° to 60° C. The reaction mixture is passed by line 2 through a settler C which functions as a catalyst removal zone wherein the catalyst is removed as a precipitated sludge by line 3. The supernatant liquid is then passed by line 4 to washing and filtration D to remove the residual catalyst. The resin containing stream 5 is then passed to a stripping tower E using atmospheric pressure. The resin is stripped to a bottoms temperature of approximately 250° C. and the crude resin is removed from the bottom of the tower E by line 6. This crude resin may then, if desired, be passed by line 7 and subjected to a further finishing step in a steam stripping or vacuum distillation tower F in which final residual volatiles boiling at 220° C. and above are removed overhead as line 8 and the finished resin is recovered as a bottoms product via line 9.

Resort may be had to various modifications and variations without departing from the spirit of the invention or the scope of the appended claims.

"Refractive index" as used herein refers to the conventional meaning of such term, i.e. refractive index taken at 20° C. See the procedure of the American Society for Testing Materials, Method D–1218–52, Tentative Method for Refractive Index of Hydrocarbon Liquids.

What is claimed is:

1. An improved process for the preparation of a hydrocarbon-soluble petroleum resin which comprises steam cracking at about 540° to 815° C. a petroleum fraction boiling between about 85° and 500° C. selected from a group consisting of naphtha, kerosene, and gas oil, removing from the resulting steam cracked product a second fraction boiling between about 85° and 275° C. containing 10 to 20 wt. percent diolefins, 18 to 60 wt. percent aromatic hydrocarbons, 20–60 wt. percent monoolefins and 0 to 30 wt. percent paraffins and naphthenes wherein at least 70 wt. percent of such second fraction boils above about 130° and wherein 5 to 20 wt. percent of said second fraction is made up of reactive aromatic hydrocarbons selected from a group consisting of $C_8$ to $C_{14}$ vinyl aromatic hydrocarbons and indenes, polymerizing said second fraction by contacting it with a Friedel-Crafts polymerization catalyst at about −10° C. to about +70° C. and recovering the resulting hydrocarbon-soluble resin.

2. An improved process for the preparation of a hydrocarbon-soluble petroleum resin which comprises steam cracking at about 540° to 815° C. in the presence of about 65 to 90 mol percent of steam, a petroleum hydrocarbon fraction boiling between about 120° and 450° C. and having an API° gravity of about 30 to 45 and an aniline point between about 70° and 220° F., removing from the resulting steam cracked product a second fraction boiling between about 85° and 275° C. containing 10 to 20 wt. percent diolefins, 18 to 60 wt. percent aromatic hydrocarbons, 20 to 60 wt. percent monoolefins and 0 to 30 wt. percent paraffins and naphthenes wherein at least 70 wt. percent of such second fraction boils in the range of 130° to 275° C. and wherein 5 to 20 wt. percent of said second fraction is made up of reactive aromatic hydrocarbons selected from a group consisting of $C_8$ to $C_{14}$ vinyl aromatic hydrocarbons and indenes polymerizing said second fraction by contacting it with 0.25 to 3.0 wt. percent based on said second fraction of an aluminum halide polymerization catalyst at about −10° C. to about +70° C. and recovering the resulting hydrocarbon-soluble resin.

3. Resin produced by the process of claim 2, said resin being soluble in hydrocarbons, having a softening point of about 90° C. to 120° C. and an iodine number below about 100.

4. An improved process for the preparation of a hydrocarbon-soluble petroleum resin which comprises steam cracking at about 540° to 815° C., a petroleum fraction boiling between about 150° to 400° C. having an API° gravity between about 30 and 45, an aniline point between about 70° and 200° F., an average molecular weight between about 150 and 400, and containing about 5 to 40 wt. percent aromatic hydrocarbons and 60 to 95 wt. percent paraffins and naphthenes, removing from the resulting steam cracked product the second fraction boiling between about 130° and 275° C. containing 10 to 20 wt. percent diolefins, 18 to 60 wt. percent aromatic hydrocarbons, 20 to 60 wt. percent monoolefins and 0 to 30 wt. percent paraffins and naphthenes, wherein 5 to 20 wt. percent of said second fraction is made up of reactive aromatic hydrocarbons selected from the group consisting of $C_8$ to $C_{14}$ vinyl aromatic hydrocarbons and indenes, polymerizing said second fraction by contacting it with 0.25 to 3.0 wt. percent based on said second fraction of an aluminum chloride polymerization catalyst at about 0° C. to about 60° C. and recovering the resulting hydrocarbon-soluble resin.

References Cited in the file of this patent

UNITED STATES PATENTS

| | | |
|---|---|---|
| 1,982,708 | Thomas et al. | Dec. 4, 1934 |
| 2,084,012 | Thomas | June 15, 1937 |
| 2,698,841 | McKay | Jan. 4, 1955 |
| 2,734,046 | Nelson et al. | Feb. 7, 1956 |
| 2,750,360 | Moore | June 12, 1956 |
| 2,758,988 | Banes et al. | Aug. 14, 1956 |
| 2,770,614 | Howarth et al. | Nov. 13, 1956 |

OTHER REFERENCES

Thomas et al.: "Ind. and Eng. Chem.," vol. 24 (1932), pp. 1125–28.